United States Patent Office 3,531,509
Patented Sept. 29, 1970

---

3,531,509
PREPARATION OF o-ISOCYANATO-BENZOYL CHLORIDES
Adnan A. R. Sayigh, North Haven, and Henri Ulrich, North Branford, Conn., assignors to The Upjohn Company, Kalamazoo, Mich., a corporation of Delaware
No Drawing. Filed Dec. 20, 1966, Ser. No. 603,112
Int. Cl. C07c *119/04;* C08g *22/18, 22/44*
U.S. Cl. 260—453                              6 Claims

ABSTRACT OF THE DISCLOSURE

Isatoic anhydride, unsubstituted or substituted by inert groups (i.e. groups unaffected by phosgenation), is converted to the corresponding o-isocyanatobenzoyl chloride in high yield by phosgenation in the presence of certain catalysts. The latter are N-alkyl-N-(alkyl or aryl)-formamides or alkanoamides, N-alkyllactams, N-alkyl-N-(alkyl or aryl)-N'-arylformamidines or alkanamidines, and N,N'-dialkyl-N,N'-di(alkyl or aryl)-N''-arylguanidines. The o-isocyanatobenzoyl chlorides are intermediates e.g. reaction with alkanolamines yields aminoalkyl N-(aminoalkoxycarbonyl)-anthranilates which are phosgenated to the corresponding diisocyanates, useful in the preparation of polyurethanes.

A process for the conversion of isatoic anhydride, either unsubstituted or substituted by inert groups, to the corresponding o-isocyanatobenzoyl chlorides in high yield. The process requires phosgenation of the isatoic anhydride in the presence of a catalytic amount of an N-alkyl-N-(alkyl or aryl)-substituted formamide or alkanoamide, an N-alkyl-lactam, an N-alkyl-N(alkyl or aryl)-N'-arylformamidine or alkanamidine, or an N,N'-dialkyl-N,N'-di(alkyl or aryl)-N''-arylguanidine.

BACKGROUND OF THE INVENTION

Field of the invention

This invention relates to a novel process for the conversion of isatoic anhydride and related compounds to the corresponding o-isocyanatobenzoyl chlorides and is more particularly concerned with a process for the catalytic phosgenation of isatoic anhydride and related compounds to the corresponding o-isocyanatobenzoyl chlorides.

Description of the prior art

The conversion of isatoic anhydride to o-isocyanatobenzoyl chloride by reaction of the anhydride with either thionyl chloride or with phosphorus pentachloride has been described by Iwakura et al., J. Org. Chem. 31, 142, 1966. The latter workers attempted to convert o-aminobenzoic acid to an o-isocyanatobenzoyl chloride by direct phosgenation but were unable to obtain more than traces of the latter compound the main product being isatoic anhydride which apparently resisted further attack by phosgene.

SUMMARY OF THE INVENTION

We have now found that isatoic anhydride and substituted isatoic anhydrides can be converted readily and in high yield to the corresponding o-isocyanatobenzoyl chlorides by direct phosgenation provided one or more of certain catalysts are present in the reaction mixture.

The novel process of the invention comprises a process for the conversion of isatoic anhydride, which is substituted by from 0 to 4 inert substituents, to the corresponding o-isocyanatobenzoyl chloride by reacting said isatoic anhydride with phosgene in the presence of a catalytic amount of at least one compound selected from the class consisting of compounds having the formulae:

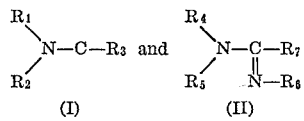

wherein $R_1$ taken alone represents lower-alkyl, $R_2$ is selected from the class consisting of hydrogen and lower-alkyl, $R_1$ taken together with $R_2$ and the attached N atom represents the residue of a saturated heterocyclic secondary amine having from 4 to 6 carbon atoms in the ring thereof, $R_1$ taken together with $R_3$ and the N and C atoms, respectively, to which they are bonded, represents the residue of a lactam having from 4 to 6 carbon atoms in the ring, $R_4$ represents lower-alkyl, $R_5$ is selected from the class consisting of lower-alkyl and aryl, $R_4$ and $R_5$ taken together with the N atom to which they are attached represent the residue of a saturated heterocyclic secondary amine having from 4 to 6 carbon atoms, inclusive, in the ring thereof, $R_6$ represents aryl, and $R_7$ is selected from the class consisting of hydrogen and

wherein $R_4$ and $R_5$ are as hereinbefore defined.

The term "inert substituent" as used throughout the specification means a substituent which is inert under the conditions of the reaction i.e. does not react with the phosgene or catalyst employed in the reaction or in any other way interfere with the course of the reaction. Examples of said inert substituents are alkyl, for example, methyl, ethyl, isopropyl, hexyl, octyl, and the like; alkoxy such as methoxy, ethoxy, propoxy, pentyloxy, octyloxy, and the like; alkylthio such as methylthio, ethylthio, propylthio, hexylthio octylthio, and the like; halo, i.e. fluoro, chloro, bromo and iodo; alkoxycarbonyl such as methoxycarbonyl, propoxycarbonyl, hexyloxycarbonyl, octyloxycarbonyl, and the like; nitro; cyano; and the like.

The term "lower-alkyl" as used throughout the specification means alkyl from 1 to 8 carbon atoms, inclusive, such as methyl, ethyl, propyl, butyl, pentyl, hexyl, heptyl, octyl, and isomeric forms thereof. The term "aryl" as used throughout the specification means the residue of an aromatic hydrocarbon from which one hydrogen atom has been removed; examples of aryl are phenyl, tolyl, xylyl, naphthyl, biphenylyl, and the like. The term "residue of a lactam having from 4 to 6 carbon atoms in the ring" is inclusive of α-pyrrolidino, alkyl-substituted-α-pyrrolidono such as 3-methyl-α-pyrrolidono, 4-methyl-α-pyrrolidono, and the like, α-piperidino, alkyl-substituted-α-piperidono such as 3-methyl-α-piperidono, 4-ethyl-α-piperidono, and the like, and homo-α-piperidono. The term "residue of a saturated heterocyclic secondary amine having from 4 to 6 carbon atoms, inclusive, in the ring thereof" is inclusive of pyrrolidino, alkylpyrrolidino such as 2-methylpyrrolidino, 2,2-dimethylpyrrolidino, and the like, piperazino, alkylpiperazino such as 4-methylpiperazino, 2,4-dimethylpiperazino, and the like, morpholino, piperidino, alkylpiperidino such as 2-methylpiperidino, 3-methylpiperidino, and the like, hexamethyleneimino, homopiperazino, homomorpholino, and the like.

The novel process of the invention can be represented schematically as follows.

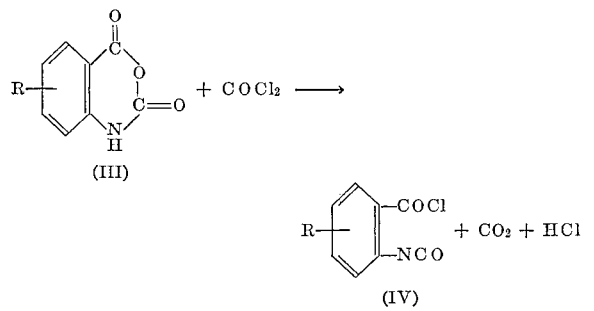

(IV)

In the above equation R represents from 0 to 4 inert substituents as hereinbefore defined. In carrying out the process of the invention the compound (III) and phosgene are brought together in the presence of the catalyst of Formula I or II and, advantageously, in the presence of an inert solvent. The inert solvent can be any organic solvent which does not enter into reaction with any of the reactants or in any other way interfere with the process of the invention. Illustrative of inert solvents which can be employed are: aliphatic hydrocarbons such as pentane, hexane, heptane, octane, and the like; aromatic hydrocarbons such as benzene, toluene, xylene, and the like; chlorinated aliphatic hydrocarbons such as chloroform, carbon tetrachloride, methylene chloride, ethylene dichloride, and the like; chlorinated aromatic hydrocarbons such as chlorobenzene, dichlorobenzene, trichlorobenzene, chlorotoluenes, chloroxylenes, and the like; nitro substituted aromatic hydrocarbons such as nitrobenzene, o-nitrotoluene, m-dinitrobenzene, 4-nitro-m-xylene, and the like; and nitro-substituted aliphatic hydrocarbons such as nitromethane, nitroethane, nitropropane, and the like.

Advantageously the initial admixture of isatoic anhydride (III) and phosgene in the presence of catalyst and solvent is conducted at a temperature of about 20° C. to about 40° C. The phosgene is conveniently added as a continuous stream throughout the reaction period. The catalyst can be added as a single batch at the beginning of the reaction or can be added continuously or portionwise throughout the period of reaction. When the reactants have been brought together in the above manner the reaction temperature is raised to a value within the range of about 100° C. to about 200° C. and preferably within the range of about 120° C. to about 130° C. This temperature is maintained until the conversion to isocyanatobenzoyl chloride (IV) is complete as indicated by routine analytical methods, for example infrared spectral analysis, titration of an aliquot for isocyanate content, and the like.

At the completion of reaction the desired isocyanatobenzoyl chloride (IV) is isolated from the reaction mixture by conventional procedures. For example, the excess phosgene is removed by purging with an inert gas such as nitrogen and the inert solvent is removed by distillation. The residue is purefied by conventional procedures such as distillation, chromatographic separation, countercurrent distribution and the like to isolate the desired compound (IV).

The amount of catalyst of Formula I or II employed in the above process is advantageously within the range of about 0.1 to about 10% by weight, based on isatoic anhydride (III). Such amounts are referred to herein as catalytic amounts. Amounts of catalyst in excess of 10% by weight based on anhydride III can be employed if desired but offer little advantage in performance on a time-yield basis over amounts within the above range. The practical upper limit is dictated largely by economic factors as will be obvious to one skilled in the art. The preferred amount of catalyst employed is within the range of about 1% to about 3% by weight based on anhydride (III).

The amount of phosgene employed in the above process can be of the order of stoichiometric i.e. 1 mole per mole of isatoic anhydride (III) but is preferably slightly in excess of this amount such as in amounts of 1.2 to 1.5 moles of phosgene per mole of isatoic anhydride (III). Higher amounts of phosgene can be employed if desired but offer no advantage in the way of increased yield or accelerated reaction rates.

Examples of isatoic anhydrides (III) which can be phosgenated in accordance with the process of the invention are set forth below, the system of numbering employed in naming the various compounds being that used by Chemical Abstracts as illustrated by the following:

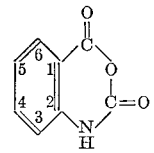

Examples of compounds of Formula III are:

Isatoic anhydride,
6-carbomethoxyisatoic anhydride,
3-, 4-, 5- and 6-chloroisatoic anhydride,
3-, 4-, 5- and 6-bromoisatoic anhydride,
3-, 4-, 5- and 6-fluoroisatoic anhydride,
3,5-dibromoisatoic anhydride,
3,5-dichloroisatoic anhydride,
3,5-diiodoisatoic anhydride,
6-ethylisatoic anhydride,
6-propylisatoic anhydride,
3-methylisatoic anhydride,
6-trifluoromethylisatoic anhydride, and the like.

The anhyrides (III) are for the most part known in the art and can be prepared by conventional procedures for example by the action of phosgene on the corresponding o-aminobenzoic acid using the procedure described by Iwakura et al., supra.

The corresponding o-aminobenzoic acids are themselves prepared by nitration of the corresponding substituted benzoic acids followed by reduction of the nitro group, using procedures well-known in the art for such reductions, to yield the desired o-aminobenzoic acids. Alternatively the substituted isatoic anhydrides (III) can be prepared as described by O'Sullivan et al. J. Chem. Soc. 1957, 2916 by oxidation, using chromic acid in acetic acid, of the corresponding isatins which latter are in turn prepared from the correspondingly substituted aniline using the procedure described by O'Sullivan et al., ibid., 1956, 2207.

If desired the anhydrides (III) can be prepared in situ in the reaction vessel by treating the corresponding o-aminobenzoic acid with phosgene as described by Iwakura, supra, and then subjecting the isatoic anhydrides so obtained to the process of the invention as hereinbefore defined.

While the process of the invention has been described so far in terms of its application to the conversion of isatoic anhydride itself and simple substituted isatoic anhydrides of the Formula III said process man be applied also to related aromatic compounds which contain two or more anhydride moieties corresponding to that in isatoic anhydride itself. In such cases each of the anhydride moieties will be opened in accordance with the reaction scheme set forth above for the conversion of anhydride (III) to o-isocyanatobenzoyl chloride (IV). Thus, the process of the invention is broadly applicable to the conversion of anhydrides of o-carboxyamino-substituted aromatic carboxylic acids to the corresponding o-isocyanato-substituted aromatic carboxylic acid chlorides. Said anhydrides employed as starting materials are inclusive of compounds containing one or more anhydride moieties attached to the same or separate rings in aromatic hydrocarbons such as benzene, naphthalene, anthracene, phenanthrene, and the like, as well as in aromatic hydrocarbons containing two or more aromatic nucleii which are bridged by methylene, —$SO_2$—, —O—, and the like.

Examples of compounds containing two or more isatoic anhydride moieties which can be subjected to the process of the invention are 2,5-di(carboxyamino)terephthalic acid dianhydride, 3,3'-dicarboxy-4,4'-di(carboxyamino) diphenyl dianhydride, 3,3'-dicarboxy-4,4'-di(carboxyamino)diphenylmethane dianhydride, 2,7 - dicarboxy - 3,6-di(carboxyamino)naphthalene dianhydride, 2,7 - dicarboxy-3,6-di(carboxyamino)anthracene dianhydride, 3,3'-dicarboxy-4,4'-di(carboxyamino)diphenylsulfone dianhydride, and the like.

Said compounds containing two or more isatoic anhydride moieties can be prepared from the corresponding o-aminocarboxylic acids, using the procedure described, for example, by Iwakura, supra, and said o-aminocarboxylic acids can be prepared by procedures well-known in the art, for example, by nitration of the corresponding carboxylic acids to obtain the corresponding o-nitrocarboxylic acids followed by reduction of the latter, using procedures well-known in the art for the reduction of aromatic nitro compounds, to the corresponding amines.

The compounds of Formula I above which are employed as catalysts in the process of the invention are for the most part known in the art and are inclusive of N-alkyl-N-(alkyl or aryl)-substituted formamides and alkanoamides as well as N-alkyl-lactams. Representative of compounds falling within the Formula I are dimethylformamide, diethylformamide, N - methyl - N - isopropylformamide, N,N-dihexylformamide, N,N-dimethylacetamide, N-ethyl-N-isopropylbutyramide, N,N - dimethylhexanoamide, N-formylpyrrolidine, N-formylhexamethyleneimine, N-acetylpyrrolidine, N-butyrylpyrrolidine, N-hexanoylpyrrolidine, N-methylformanilide, N-methylacetanilide, N-ethylacetanilide, N-methylbutyrolactam, N-butylbutyrolactam, N-methyl-ε-caprolactam, and the like.

The compounds of Formula II above which are employed in the process of the invention are for the most part known in the art and are inclusive of N-alkyl-N-(alkyl or aryl)-N'-arylformamidines and alkanamidines, and of N,N'-dialkyl-N,N'-di(alkyl or aryl)-N''-arylguanidines. Representative of compounds falling within the Formula II are N,N,N',N'-tetramethyl-N''-phenylguanidine, N,N-dimethyl-N'N'-diethyl-N''-phenylguanidine, N,N'-dimethyl - N',N' - diethyl - N'' - phenylguanidine, N,N'-dimethyl-N,N'-diethyl-N''-phenylguanidine, N,N,N',N'-tetramethyl-N''-p-tolylguanidine, N,N-dimethyl - N' - phenylformamidine, N,N-diethyl-N'-phenylformamidine, N,N-dihexyl-N'-o-tolylformamidine, N,N-dimethyl-N'-p-xylylacetamidine, and the like.

The above compounds of Formulae I and II can be prepared by conventional procedures which will be obvious to one skilled in the art.

The o-isocyanato acid chlorides (IV) which are prepared in accordance with the process of the invention are useful as intermediates in chemical synthesis. For example, the compounds of the Formula IV can be reacted with alkanolamine hydrohalides to form the corresponding aminoalkyl N-(aminoalkoxycarbonyl) anthranilate dihydrohalides with latter can then be phosgenated, using procedures well-known in the art to yield the corresponding isocyanatoalkyl N-(isocyanatoalkoxycarbonyl)anthranilates. Illustratively, o-isocyanatobenzoyl chloride is reacted with 2 molar proportions of ethanolamine hydrochloride to yield 2-aminoethyl N-(2-aminoethoxycarbonyl)anthranilate dihydrochloride and the latter is phosgenated, using conventional procedures, to yield 2-isocyanatoethyl N-(2-isocyanatoethoxycarbonyl)anthranilate.

The diisocyanates produced from the compounds (IV) in the above manner are novel compounds which are useful as the polyisocyanate component in the preparation of both cellular and non-cellular polyurethanes in accordance with procedures known in the art; see, for example, Saunders et al., Polyurethanes, Chemistry and Technology, Part II, 1964, Interscience, New York.

Similarly the isocyanato acid chlorides produces from compounds containing more than one isatoic anhydride moiety in the molecule are polyisocyanates which can be used as such in the preparation of polyurethanes, or can be converted into tetra- or higher functional polyisocyanates by reaction with alkanolamine hydrochlorides followed by phosgenation as described above. The polyfunctional isocyanates so obtained are particularly useful in the preparation of highly crosslinked polyurethanes such as rigid non-cellular polyurethanes.

The following examples illustrate the best mode contemplated by the inventors for carrying out their invention but are not to be construed as limiting the scope thereof.

EXAMPLE 1

To a suspension of 16.3 g. (0.1 mole) of isatoic anhydride in 165 ml. of chlorobenzene was added 0.33 g. (2% by weight based on anhydride) of dimethylformamide. The mixture was stirred and heated gradually to reflux while a continuous stream of phosgene was passed into the reaction mixture at a rate of 1 g./minute. The passage of phosgene at reflux was continued until a clear solution was obtained. At this time the mixture was purged with nitrogen and the chlorobenzene was removed by distillation. The residue was distilled under reduced pressure to obtain 10.75 g. (59.2% theoretical yield) of 2-isocyanatobenzoyl chloride having a boiling point of 100 to 103° C. at a pressure of 0.3 mm. of mercury. The product solidified to yield material having a melting point of 30° C. to 33° C.

To a solution of 9.07 g. (0.05 mole) of 2-isocyanatobenzoyl chloride in 90 ml. of chlorobenzene was added 9.7 g. (0.1 mole) of ethanolamine hydrochloride and the mixture was heated to reflux and maintained thereat for 6 hr. during which time phosgene was passed into the mixture at a rate of 1 g./minute. At the end of this period a clear solution remained. This solution was purged with nitrogen and the solvent removed therefrom by distillation. The residue (15.4 g.) was 2-isocyanatoethyl N-2-isocyantoethoxycarbonyl anthranilate in the form of a liquid. The infrared spectrum of the compound (chloroform solutions) exhibited maxima at $2.9\mu$, $4.4\mu$, 5.65 (sh.) $\mu$, and $5.82\mu$.

The above diisocyanate can be used in the preparation of cellular and non-cellular polyurethanes using procedures known in the art; see, Saunders et al., supra.

EXAMPLE 2

A mixture of 79 g. (0.4 mole) of 5-chloroisatoic anhydride and 1.6 g. (2% by weight) of dimethylformamide in 600 ml. of chlorobenzene was stirred and phosgene was passed into the mixture at a rate of 1 g./minute. The mixture was heated to reflux and maintained thereat for 85 minutes while the phosgene stream was continued. At the end of this time a second portion of 1.6 g. (2% by weight based on anhydride) was added and the phosgenation at reflux was continued for a further 35 minutes at which time the solution was clear. The resulting product was cooled and filtered. The filtrate was evaporated to dryness and the residue was triturated with ligroin to obtain 45.5 g. (52.5% theoretical yield) of 2-isocyanato-5-chlorobenzoyl chloride in the form of a solid having a melting point of 50 to 600 C. The infrared absorption spectrum of this material (chlorobenzene solution) exhibited maxima at $4.4\mu$, $5.62\mu$ and $5.74\mu$.

Using the procedure described above, but replacing 5-chloroisatoic anhydride by the known compounds 6-carbomethoxy-, 4-chloro-, 3-bromo-, 6-fluoro-, 3,5-dibromo-, 3,5-dichloro-, 3,5-diiodo-, 6-ethyl-, 6-propyl-, 3-methyl, or 6-trifluoro-methyl- isatoic anhydride, there are obtained 6-carbomethoxy-, 4-chloro-, 3-bromo-, 6-fluoro-, 3,5-dibromo-, 3,5-dichloro-, 3,5-diiodo-, 6-ethyl-, 6-propyl-, 3- methyl-, and 6-trifluoro-methyl-2-isocyanatobenzoyl chlorides, respectively.

The above isocyanatobenzoyl chlorides can be converted by reaction with an alkanolamine hydrohalide, such as ethanolamine hydrochloride, and phosgene, using the procedure described in Example 1, to diisocyanates which can be employed in the preparation of polyurethanes using procedures known in the art, see, supra.

EXAMPLE 3

Using the procedure described in Example 1, but replacing dimethylformamide by N,N,N',N'-tetramethyl-N''-phenylguanidine, diethylformamide, N-methyl-N-isopropylformamide, N,N - dihexylformamide, N,N - dimethylacetamide, N-formylpyrrolidine, N-formylhexamethyleneimine, N-acetylpyrrolidine, N-methylformanilide, N-methylbutyrolactam, N-methyl-ε-caprolactam, N,N-dimethyl-N'-phenylformamidine, or N,N-dimethyl-N'-phenylacetamidine, there is obtained 2-isocyanatobenzoyl chloride in comparable yield.

EXAMPLE 4

Using the procedure described in Example 1, but replacing isatoic anhydride by 3,3'-dicarboxy-4,4'-di(carboxyamino)diphenyl dianhydride [obtained from 3,3'-dicarboxybenzidine (U.S. Pat. 2,570,866) using the procedure of Iwakura supra] there is obtained 3,3'-di(chlorocarbonyl)-4,4'-diisocyanatodiphenyl.

Similarly, using the procedure described in Example 1, but replacing isatoic anhydride by 3,3'-dicarboxy-4,4'-di(carboxyamino)diphenylmethane dianhydride, 2,7-dicarboxy-3,6-di(carboxyamino)naphthalene dianhydride, 2,7-dicarboxy-3,6-di(carboxyamino)anthracene dianhydride, or 3,3'-dicarboxy-4,4'-di(carboxyamino)diphenylsulfone dianhydride, there are obtained 3,3'-di(chlorocarbonyl)-4,4' - diisocyanatodiphenylmethane, 2,7 - di(chlorocarbonyl)-3,6-diisocyanatonaphthalene, 2,7 - di(chlorocarbonyl)-3,6-diisocyanatoanthracene, and 3,3'-di(chlorocarbonyl) - 4,4' - diisocyanatodiphenylsulfone, respectively. Each of the dianhydrides employed as starting material was prepared by the action of phosgene on the corresponding amino carboxylic acid using the procedure of Iwakura, supra. The amino carboxylic acids were themselves prepared by nitration of the corresponding dicarboxylic acids followed by reduction of the o-nitrocarboxylic acids, for example, using hydrogen and palladium-on-charcoal catalyst.

The diisocyanates prepared as described above can be used in the preparation of polyurethanes using procedures well-known in the art, or can be converted to tetra-isocyanates by reaction with alkanolamine hydrochlorides and phosgene, using the procedure described in Example 1 above, which tetra-isocyanates can be used in the preparation of polyurethanes using procedures well-known in the art.

EXAMPLE 5

Using the procedure described in Example 1, but replacing isatoic anhydride by 2,5-di(carboxyamino)terephthalic acid dianhydride [prepared from 2,5-diamino-terephthalic acid (Bogert et al. J. Am. Chem. Soc. 1907, 29, 729) using the procedure of Iwakura, supra] there is obtained 2,5-diisocyanatoterephthaloyl dichloride.

We claim:

1. A process for converting the anhydride of an o-carboxyamino-substituted aromatic carboxylic acid of the formula:

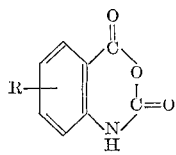

wherein R represents from 0 to 4 substituents selected from the class consisting of lower-alkyl, lower-alkoxy, lower-alkylthio, halo, and nitro, to the corresponding o-isocyanato-aromatic carboxylic acid chloride of the formula:

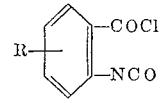

wherein R is as defined above, which process comprises reacting said anhydride at a temperature of about 100° C. to about 200° C. with at least a stoichiometric amount of phosgene in the presence of a catalytic amount of a compound selected from the class consisting of compounds having the formulae:

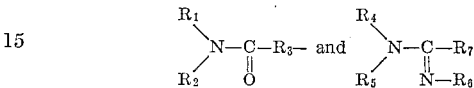

wherein $R_1$ taken alone represents lower-alkyl, $R_2$ is selected from the class consisting of lower-alkyl and aryl, $R_3$ taken alone is selected from the class consisting of hydrogen and lower-alkyl, $R_1$ taken together with $R_2$ and the attached N atom represents a saturated heterocyclic secondary amine having from 4 to 6 carbon atoms in the ring thereof, $R_1$ taken together with $R_3$ and the N and C atoms, respectively, to which they are bonded, represents a lactam having from 4 to 6 carbon atoms in the ring, $R_4$ represents lower-alkyl, $R_5$ is selected from the class consisting of lower-alkyl and aryl, $R_4$ and $R_5$ taken together with the N atom to which they are attached represent a saturated heterocyclic secondary amine having from 4 to 6 ring carbon atoms, inclusive, $R_6$ represents aryl, and $R_7$ is selected from the class consisting of hydrogen and

wherein $R_4$ and $R_5$ are as hereinbefore defined.

2. The process of claim 1 wherein the catalyst is dimethyl-formamide.

3. The process of claim 1 wherein the catalyst is N,N,N',N'-tetramethyl-N''-phenylguanidine.

4. A process for the preparation of o-isocyanatobenzoyl chloride which comprises reacting isatoic anhydride with at least a stoichiometric amount of phosgene at a temperature of about 100° C. to about 200° C. in the presence of a catalytic amount of a compound selected from the class consisting of compounds having the formulae:

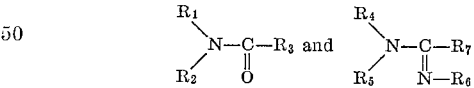

wherein $R_1$ taken alone represents lower-alkyl, $R_2$ is selected from the class consisting of lower-alkyl and aryl, $R_3$ taken alone is selected from the class consisting of hydrogen and lower-alkyl, $R_1$ taken together with $R_2$ and the attached N atom represents a saturated heterocyclic secondary amine having from 4 to 6 carbon atoms in the ring thereof, $R_1$ taken together with $R_3$ and the N and C atoms, respectively, to which they are bonded, represents a lactam having from 4 to 6 carbon atoms in the ring, $R_4$ represents lower-alkyl, $R_5$ is selected from the class consisting of lower-alkyl and aryl, $R_4$ and $R_5$ taken together with the N atom to which they are attached represent a saturated heterocyclic secondary amine having from 4 to 6 carbon atoms, inclusive, $R_6$ represents aryl, and $R_7$ is selected from the class consisting of hydrogen and

wherein $R_4$ and $R_5$ are as hereinbefore defined.

5. The process of claim 4 wherein the catalyst is dimethyl-formamide.

6. The process of claim 4 wherein the catalyst is N,N,N',N'-tetramethyl-N''-phenylguanidine.

References Cited

FOREIGN PATENTS 752,105   7/1956   Great Britain.

OTHER REFERENCES

Iwakura et al.: J. Org. Chem., vol. 31, 142–6 (1966).

Krimm et al.: Chemical Abstracts, vol. 65, p. 16908 (1966).

CHARLES B. PARKER, Primary Examiner

D. H. TORRENCE, Assistant Examiner

U.S. Cl. X.R.

260—2.5, 77.5, 244, 465, 471, 472, 476, 518